(12) United States Patent
Tong et al.

(10) Patent No.: US 10,732,687 B2
(45) Date of Patent: Aug. 4, 2020

(54) MOTHERBOARD AND ELECTRONIC DEVICE USING THE SAME

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Ming-Hui Tong, Wuhan (CN); Tai-Chen Wang, New Taipei (TW); Jun Sun, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 398 days.

(21) Appl. No.: 15/783,119

(22) Filed: Oct. 13, 2017

(65) Prior Publication Data

US 2019/0033940 A1 Jan. 31, 2019

(30) Foreign Application Priority Data

Jul. 25, 2017 (CN) .......................... 2017 1 0611699

(51) Int. Cl.
*G06F 1/26* (2006.01)
*G06F 13/40* (2006.01)

(52) U.S. Cl.
CPC ................ *G06F 1/266* (2013.01); *G06F 1/26* (2013.01); *G06F 13/4081* (2013.01)

(58) Field of Classification Search
CPC ......... G06F 1/26; G06F 1/266; G06F 13/4081
USPC ...................................................... 361/93.9
See application file for complete search history.

(56) References Cited

U.S. PATENT DOCUMENTS

| 2012/0023320 | A1* | 1/2012 | Chen | .................. G06F 11/0793 713/2 |
| 2012/0260078 | A1* | 10/2012 | Varnum | .............. G06F 15/7871 713/2 |
| 2013/0305027 | A1* | 11/2013 | Jiang | ..................... G06F 9/4401 713/2 |
| 2015/0074385 | A1* | 3/2015 | Zheng | ..................... G06F 8/654 713/2 |
| 2018/0189223 | A1* | 7/2018 | Nge | .................... G06F 13/4282 |

* cited by examiner

*Primary Examiner* — Kevin J Comber
(74) *Attorney, Agent, or Firm* — ScienBiziP, P.C.

(57) ABSTRACT

An electronic device proof against surge currents arising from hot-swapping components comprises a platform controller hub chip, an electronic component, a serial peripheral interface, and a power supply unit. The power supply unit comprises a power supply and a Zener diode, the power supply outputs a first voltage to the Zener diode, the diode converts the received first voltage to a second voltage and outputs the second voltage to one or more electronic components and the platform controller chip.

16 Claims, 3 Drawing Sheets

MOTHERBOARD AND ELECTRONIC DEVICE USING THE SAME

FIELD

The subject matter herein generally relates to motherboard, and particularly to electronic device including the motherboard.

BACKGROUND

In generally, a computer motherboard uses a 3.3V supply voltage to supply power for a chip. When the chip is hot-swappable, a very large surge current is thereby produced, and the chip can be damaged easily.

BRIEF DESCRIPTION OF THE DRAWINGS

Implementations of the present technology will now be described, by way of example only, with reference to the attached figures.

DETAILED DESCRIPTION

Figure 1:
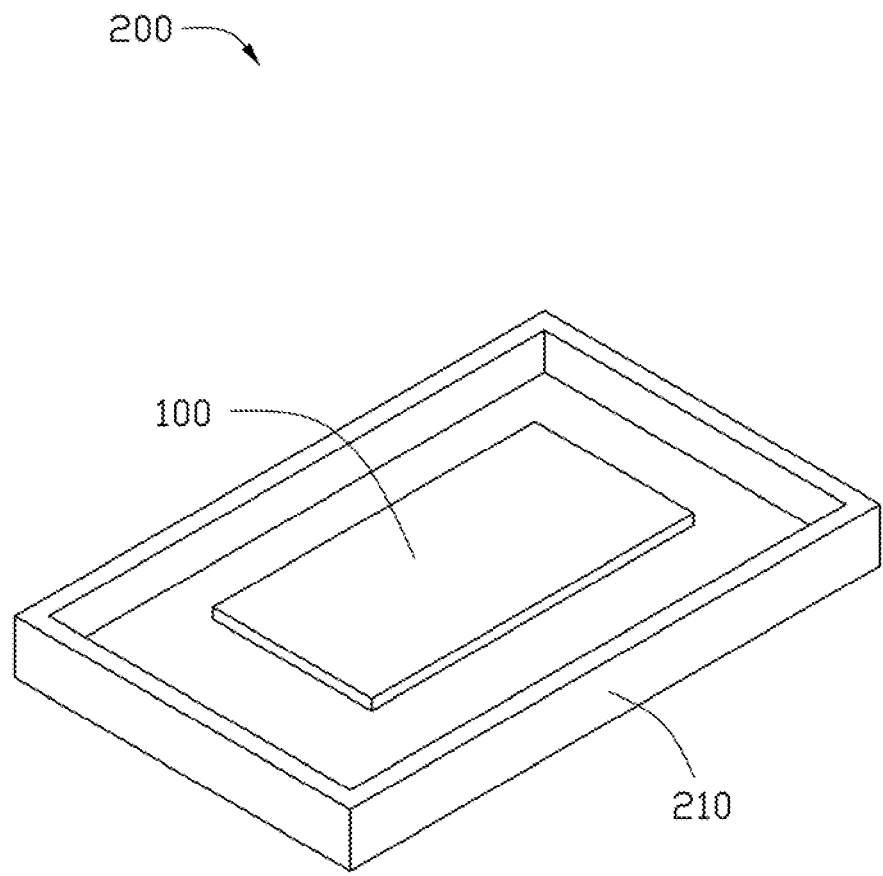
FIG. 1 is an assembled view of an embodiment of an electronic device with a motherboard.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates a motherboard 100 in an exemplary embodiment, mounted in an electronic device 200. The electronic device 200 comprises a housing 210, and the motherboard 100 received in the housing 210. In at least one exemplary embodiment, the electronic device 200 is a computer.

Figure 2:
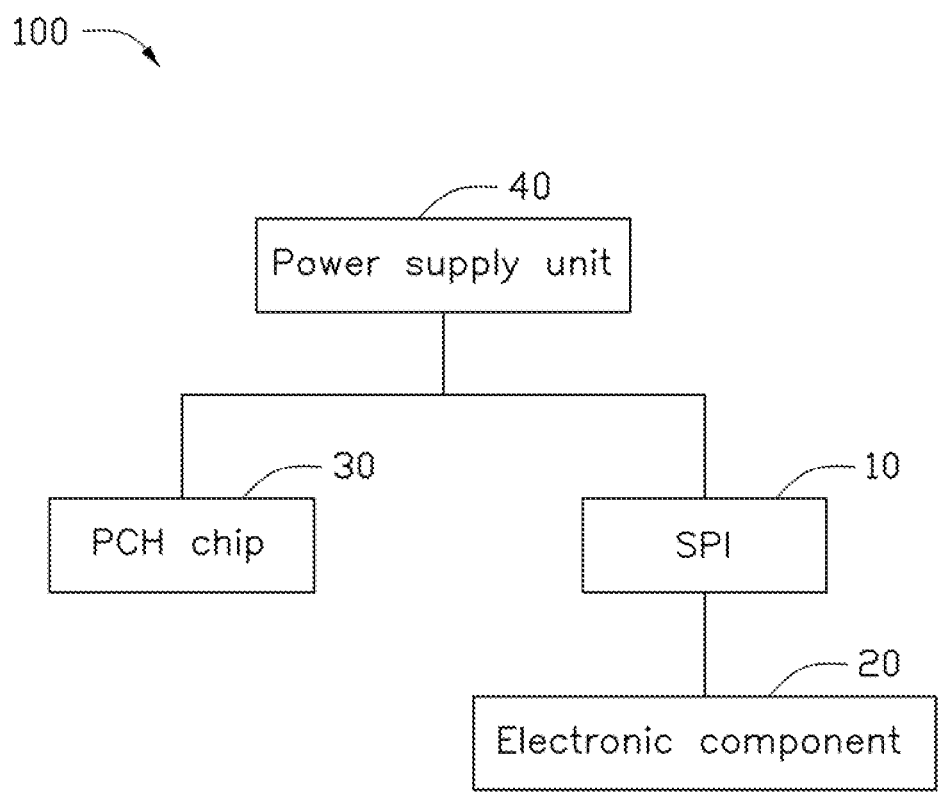
FIG. 2 is a schematic diagram of an exemplary embodiment of a motherboard.

FIG. 2 illustrates the motherboard 100 comprises a serial peripheral interface (SPI) 10, an electronic component 20, a platform controller hub (PCH) chip 30, and a power supply unit 40.

In at least one exemplary embodiment, the electronic component 20 can be a read-only memory (ROM) device.

The SPI 10 is coupled with the electronic component 20. The electronic component 20 stores a basic input output system (BIOS) program. The PCH chip 30 communicates with the electronic component 20 through the serial peripheral interface 10.

The power supply unit 40 is electrically coupled to the platform controller chip 30. The SPI 10 is electrically coupled between the electronic component 20 and the power supply unit 40.

Figure 3:
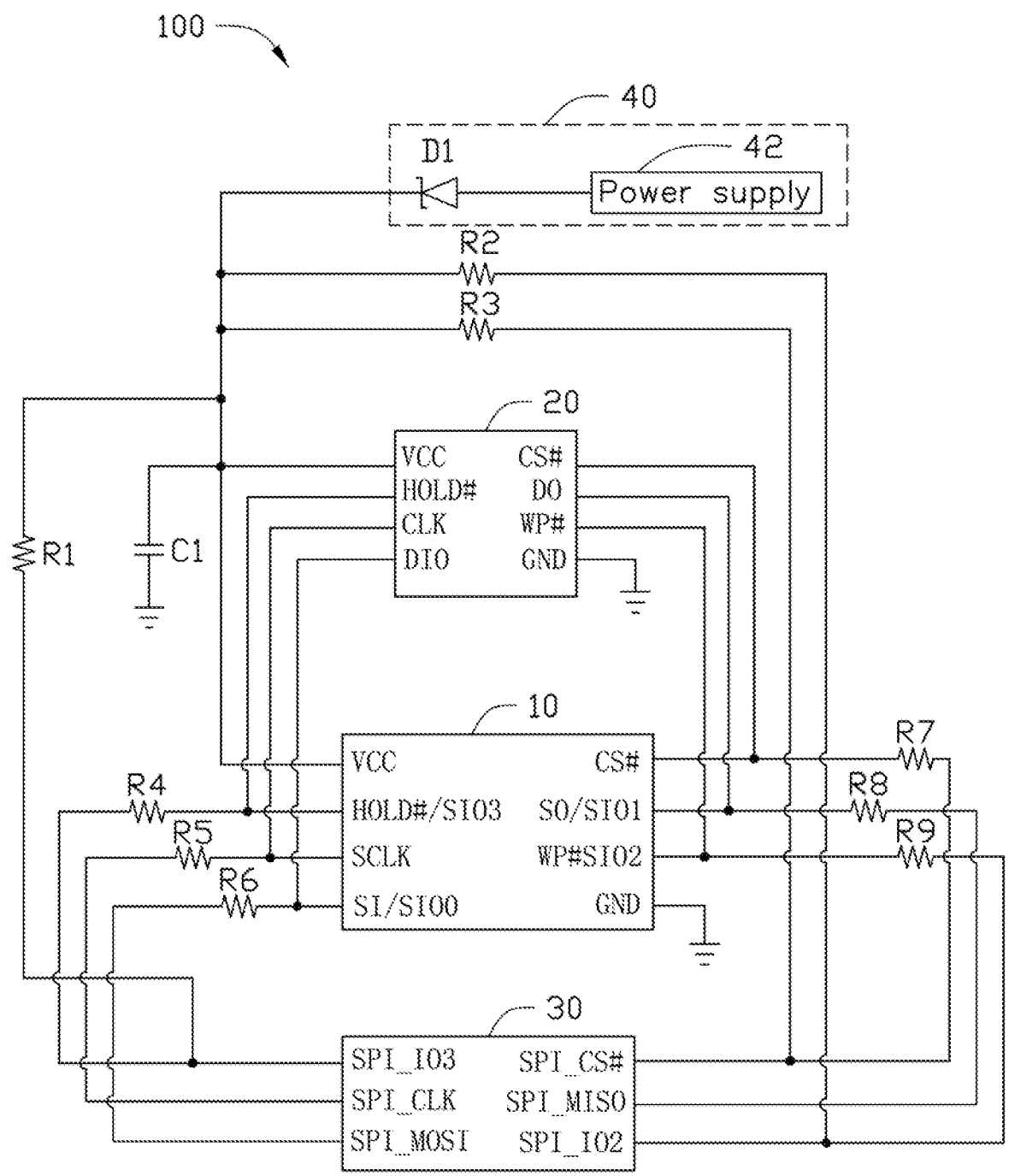
FIG. 3 is a circuit diagram of an exemplary embodiment of a motherboard.

FIG. 3 illustrates a circuit diagram of an exemplary embodiment of the motherboard 100.

The SPI 10 comprises a first detect pin HOLD #/SIO3, a second detect pin SCLK, a third detect pin SI/SIO0, a fourth detect pin CS #, a fifth detect pin SO/SIO1, a sixth detect pin WP #/SIO2, a power supply pin VCC, and a ground pin GND.

The PCH chip 30 comprises a first signal pin SPI_IO3, a second signal pin SPI_CLK, a third signal pin SPI_MOSI, a fourth signal pin SPI_CS #, a fifth signal pin SPI_MISO, and a sixth signal pin SPI_IO2. The first detect pin HOLD #/SIO3 of the SPI 10 is electrically coupled to the first signal pin SPI_IO3 of the PCH chip 30 through a resistor R4. The second detect pin SCLK of the SPI 10 is electrically coupled to the second signal pin SPI_CLK of the PCH chip 30 through a resistor R5.

The third detect pin SI/SIO0 of the SPI 10 is electrically coupled to the third signal pin SPI_MOSI of the PCH chip 30 through a resistor R6. The fourth detect pin CS # of the SPI 10 is electrically coupled to the fourth signal pin SPI_CS # of the PCH 30 through a resistor R7. The fifth detect pin SO/SIO1 of the SPI 10 is electrically coupled to the fifth signal pin SPI_MISO of the PCH chip 30 through a resistor R8.

The sixth detect pin WP #/SIO2 of the SPI 10 is electrically coupled to the sixth signal pin SPI_IO2 of the PCH chip 30 through a resistor R9. The ground pin GND of the SPI 10 is grounded. The power supply pin VCC of the SPI 10 is electrically coupled to the power supply unit 40.

In at least one exemplary embodiment, the electronic component 20 comprises a first signal pin HOLD #, a second signal pin CLK, a third signal pin DIO, a fourth signal pin CS #, a fifth signal pin DO, a sixth signal pin WP #, a power supply pin VCC, and a ground pin GND.

When the electronic component 20 connects to the SPI 10, the first, second, third, fourth, fifth, and sixth signal pins (HOLD #, CLK, DIO, CS #, DO, and WP #) of the electronic component 20 are electrically coupled respectively to the first, second, third, fourth, fifth, and sixth detect pins (HOLD #/SIO3, SCLK, SI/SIO0, CS #, SO/SIO1, and WP #/SIO2) of the SPI 10. The ground pin GND of the electronic component 20 is grounded, and the power supply pin VCC of the electronic component 20 is electrically coupled to the power supply pin VCC of the SPI 10, and is grounded through a capacitor C1.

The power supply unit 40 comprises a power supply 42 and a Zener diode D1. An anode of the Zener diode D1 is electrically coupled to the power supply 42 to receive a first voltage from the power supply 42. A cathode of the Zener diode D1 is electrically coupled to the power supply pin VCC of the SPI 10 and the power supply pin VCC of the electronic component 20 to output a second voltage to the SPI 10 and the electronic component 20.

The cathode of the Zener diode D1 is electrically coupled to the first, fourth, and sixth signal pins (SPI_IO3, SPI_CS

, and SPI_IO2) of the PCH chip 30 through respective resistors R1, R2, and R3, to output the second voltage to the PCH chip 30.

In at least one exemplary embodiment, the power supply 42 can be a +3.3V direct current (DC) power supply. The 3.3V voltage outputted from the power supply 42 generates a voltage drop across the Zener diode D1.

That is, the cathode of the Zener diode D1 will output a voltage of about 2.6V to the electronic component 20, to provide operating voltage for the electronic component 20.

The unidirectional conductivity of the Zener diode D1 avoids damage by the impact of a surge current when the electronic component 20 is hot-swapped. In addition, the Zener diode D1 can also isolate other circuits from the electronic component 20 in terms of interference.

When the motherboard 100 is turned on, the power supply 42 outputs a 3.3V voltage to the Zener diode D1 and generates a voltage drop to output the 2.6V voltage to the electronic component 20 and the PCH chip 30. In the meantime, the electronic component 20 receives the 2.6V voltage to operate normally, and communicates with the PCH chip 30.

When the motherboard 100 is turned off suddenly, the electronic component 20 is prevented from being damaged by the impact of surge current because of the one-way conductivity of the Zener diode D1.

In this way, the Zener diode D1 provided between the power source 42 and the electronic component 20 avoids damage by a surge current.

The exemplary embodiments shown and described above are only examples. Many details are often found in the art such as the other features of motherboard. Therefore, many such details are neither shown nor described.

Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A motherboard comprising:
a platform controller hub (PCH) chip;
an electronic component storing a basic input output system (BIOS) program and communicating with the PCH chip;
a serial peripheral interface (SPI) coupling to the electronic component, the PCH chip coupling to the electronic component through the SPI; and
a power supply unit coupling to the SPI and the PCH chip;
wherein the power supply unit comprises a power supply and a Zener diode, the power supply outputs a first voltage to the Zener diode, the Zener diode converts the first voltage to a second voltage and outputs the second voltage to supply power for the electronic component and the PCH chip; and
wherein the SPI comprises a first detect pin, a second detect pin, a third detect pin, a fourth detect pin, a fifth detect pin, a sixth detect pin, a power supply pin, and a ground pin; the ground pin is grounded, the power supply pin is electrically coupled to the power supply unit, and the first detect pin, the second detect pin, the third detect pin, the fourth detect pin, the fifth detect pin, and the sixth detect pin of the SPI are electrically coupled to the PCH chip.

2. The motherboard of claim 1, wherein the PCH chip comprises a first signal pin, a second signal pin, a third signal pin, a fourth signal pin, a fifth signal pin, and a sixth signal pin; the first detect pin of the SPI is electrically coupled to the first signal pin of the PCH chip through a first resistor, the second detect pin of the SPI is electrically coupled to the second signal pin of the PCH chip through a second resistor, the third detect pin of the SPI is electrically coupled to the third signal pin of the PCH chip through a third resistor, the fourth detect pin of the SPI is electrically coupled to the fourth signal pin of the PCH chip through a fourth resistor, the fifth detect pin of the SPI is electrically coupled to the fifth signal pin of the PCH chip through a fifth resistor, and the sixth detect pin of the SPI is electrically coupled to the sixth signal pin of the PCH chip through a sixth resistor.

3. The motherboard of claim 1, wherein the electronic component comprises a first signal pin, a second signal pin, a third signal pin, a fourth signal pin, a fifth signal pin, a sixth signal pin, a power supply pin, and a ground pin; when the electronic component connects to the SPI, the first signal pin, second signal pin, third signal pin, fourth signal pin, fifth signal pin, and sixth signal pin of the electronic component are electrically coupled respectively to the first detect pin, second detect pin, third detect pin, fourth detect pin, fifth detect pin, and sixth detect pin of the SPI, the ground pin of the electronic component is grounded, and the power supply pin of the electronic component is electrically coupled to the power supply pin of the SPI.

4. The motherboard of claim 3, wherein the power supply pin of the electronic component is grounded through a first capacitor.

5. The motherboard of claim 1, wherein an anode of the Zener diode is electrically coupled to the power supply to receive the first voltage from the power supply, and a cathode of the Zener diode is electrically coupled to the power supply pin of the SPI, to output the second voltage to the electronic component when the electronic component is interfaced with the SPI.

6. The motherboard of claim 5, wherein the cathode of the Zener diode is electrically coupled respectively to the first signal pin, fourth signal pin, and sixth signal pin of the PCH chip respectively through a seventh resistor, an eighth resistor, and a ninth resistor, to output the second voltage to the PCH chip.

7. The motherboard of claim 1, wherein the power supply is a +3.3V direct current (DC) power supply.

8. The motherboard of claim 1, wherein the electronic component is a read-only memory (ROM).

9. An electronic device comprising:
a housing; and
a motherboard received in the housing and comprising:
a platform controller hub (PCH) chip;
an electronic component storing a basic input output system (BIOS) program and communicating with the PCH chip;
a serial peripheral interface (SPI) coupling to the electronic component, the PCH chip coupling to the electronic component through the SPI; and
a power supply unit coupling to the SPI and the PCH chip;
wherein the power supply unit comprises a power supply and a Zener diode, the power supply outputs a first voltage to the Zener diode, the Zener diode converts the first voltage to a second voltage and outputs the second voltage to supply power for the electronic component and the PCH chip; and wherein the SPI comprises a first detect pin, a second detect pin, a third detect pin, a fourth detect pin, a fifth detect pin, a sixth detect pin, a power supply pin, and a ground pin; the ground pin is grounded, the power supply pin is electrically coupled to the power supply unit, and the first detect pin, the second detect pin, the third detect pin, the fourth detect pin, the fifth detect pin, and the sixth detect pin of the SPI are electrically coupled to the PCH chip.

10. The electronic device of claim 9, wherein the PCH chip comprises a first signal pin, a second signal pin, a third signal pin, a fourth signal pin, a fifth signal pin, and a sixth signal pin; the first detect pin of the SPI is electrically coupled to the first signal pin of the PCH chip through a first resistor, the second detect pin of the SPI is electrically coupled to the second signal pin of the PCH chip through a second resistor, the third detect pin of the SPI is electrically coupled to the third signal pin of the PCH chip through a third resistor, the fourth detect pin of the SPI is electrically coupled to the fourth signal pin of the PCH chip through a fourth resistor, the fifth detect pin of the SPI is electrically coupled to the fifth signal pin of the PCH chip through a fifth resistor, and the sixth detect pin of the SPI is electrically coupled to the sixth signal pin of the PCH chip through a sixth resistor.

11. The electronic device of claim 10, wherein the electronic component comprises a first signal pin, a second signal pin, a third signal pin, a fourth signal pin, a fifth signal pin, a sixth signal pin, a power supply pin, and a ground pin; when the electronic component connects to the SPI, the first signal pin, second signal pin, third signal pin, fourth signal pin, fifth signal pin, and sixth signal pin of the electronic component are electrically coupled respectively to the first detect pin, second detect pin, third detect pin, fourth detect pin, fifth detect pin, and sixth detect pin of the SPI, the ground pin of the electronic component is grounded, and the power supply pin of the electronic component is electrically coupled to the power supply pin of the SPI.

12. The electronic device of claim 11, wherein the power supply pin of the electronic component is grounded through a first capacitor.

13. The electronic device of claim 10, wherein an anode of the Zener diode is electrically coupled to the power supply to receive the first voltage from the power supply, and a cathode of the Zener diode is electrically coupled to the power supply pin of the SPI, to output the second voltage to the electronic component when the electronic component is interfaced with the SPI.

14. The electronic device of claim 12, wherein the cathode of the Zener diode is electrically coupled respectively to the first signal pin, fourth signal pin, and sixth signal pin of the PCH chip respectively through a seventh resistor, an eighth resistor, and a ninth resistor, to output the second voltage to the PCH chip.

15. The electronic device of claim 9, wherein the power supply is a +3.3V direct current (DC) power supply.

16. The electronic device of claim 9, wherein the electronic component is a read-only memory (ROM).

* * * * *